Patented Aug. 5, 1930

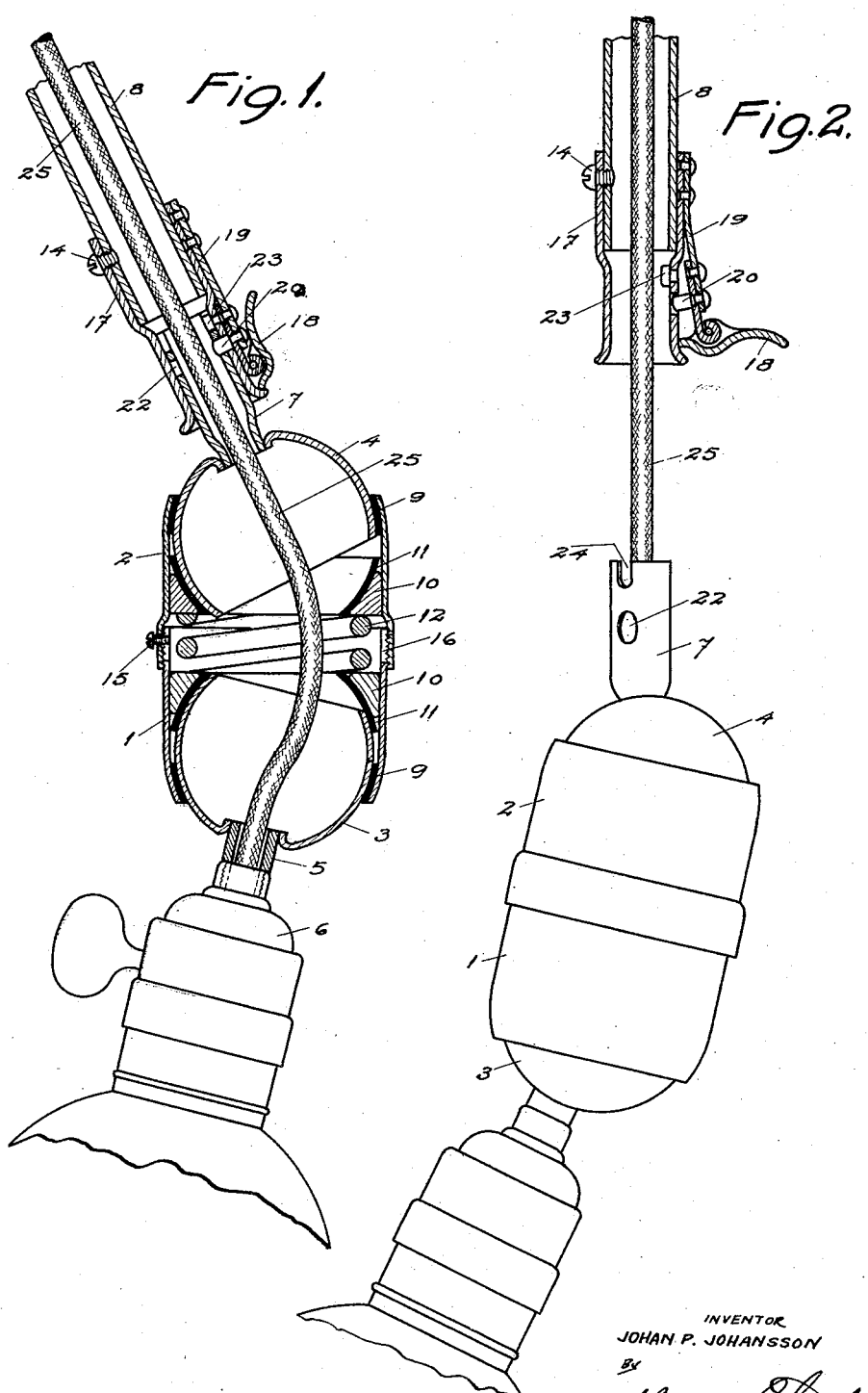

1,772,284

UNITED STATES PATENT OFFICE

JOHAN PETTER JOHANSSON, OF ENKOPING, SWEDEN

ADJUSTABLE SUPPORT FOR ELECTRIC LAMPS

Application filed November 19, 1927. Serial No. 234,432.

The present invention relates to an adjustable support for electric lamps provided with universal joint at the end of the support and consists of an arrangement whereby the joint may be detached from the support.

It is often of great value if it is possible to get the lamp free from the support, so that the lamp can be used as a handlamp. In such a case the cord must be drawn out from the support and since the cord in the universal joint may be in a bent position and thus difficult to draw through the joint the best way to detach the lamp is to detach the joint with the lamp. The detachment must then be easily made and means must be provided so as to facilitate the connection between the joint and the support.

The annexed drawing shows an embodiment of the invention in Figs. 1 and 2.

Figure 1 illustrates in sectional elevation the universal joint attached to the support.

Figure 2 illustrates in part sectional elevation the universal joint detached from the support.

With reference to the drawing, 1 and 2 are the two parts of the sleeve, 3 and 4 the two hollow bodies inserted in the sleeve and shaped according to a spherical surface, one 3, of these bodies being provided with a tubular threaded fastening 5 for the connection with the lamp-holder 6 while the other body 4 is provided with a sleeve-shaped part 7 for connecting it to a stem 8 or any other support. In order to arrange the bodies in the halves of the sleeve at a sufficient friction, each end of the sleeve is internally provided with a friction-ring 9 of fibre or the like, against which the bodies rest under pressure by the influence of fastening-rings 10 acting from the opposite sides of the bodies, which rings may also be provided with friction-surfaces 11 of fibre. These two fastening-rings 10 are kept pressed against the hollow bodies 3, 4 respectively by means of a spiral spring 12 inserted between them, the tension of said spring being adjustable by screwing the halves 1, 2 of the sleeve more or less, one of them, 1, being for this purpose provided with an external thread, while the second one, 2, is provided with a corresponding internal thread. To maintain the halves of the sleeve in the desired screwed-in position a screw 15 penetrates the half 2, said screw being brought to extend into one or the other of notches 16 arranged round the circumference of the half 1.

In order to mount the turning-joint detachably at the support 8, the arrangement shown in the drawing may be used, which consists of a sleeve or tube 17 fixed to the support 8 by means of a screw 14, said sleeve or tube 17 being connected with a resilient plate 19 acted upon by a double-armed lever 18; this plate is, near said lever, provided with a pin 20 which, on the lever 18 turning from the position, shown in Fig. 1 to that of Fig. 2 may be brought out of an aperture 21 arranged in the wall of the tube 17.

The sleeve-shaped connection 7 on the hollow body 4 of the turning-joint is inserted in the bottom part of this tube 17 and is maintained by said pin 20, which when occupying the position shown in Fig. 1 may then extend into one or the other of a pair of apertures 22 arranged in the part 7. In order to center the part 7 in the tube 17 so that an aperture will surely register with the pin, that is to say, get a position quite in front of the pin, the tube 17 is internally provided with a guide-pin 23, cooperating with guide-grooves 24 arranged in a corresponding manner in the part 7.

As illustrated by the drawing the double universal joint allows the lamp support to be adjusted to form a great angle with the stem 8 and even when the universal joint is turned to its utmost end position (in Fig. 1 a medium position is shown) the electric conducting wire 25 has clear space so that all danger of the said conducting wire being hurt is avoided.

Having now particularly described the nature of my invention and the manner of its operation, what I claim is:

1. An arrangement for detachably mounting universal joints for electric lamps comprising, a tubular support, a sleeve co-axially attached thereto and provided with an aperture in the periphery thereof, a resilient plate positioned on said sleeve, a pin positioned on said resilient plate and adapted to enter said aperture, a double armed lever intermediately pivoted on the free end of said resilient plate and a sleeve-shaped connection attached to said universal joint, adapted to enter said sleeve and provided with a plurality of apertures adapted to receive said pin.

2. An arrangement for detachably mounting universal joints for electric lamps comprising, a tubular support, a sleeve co-axially attached thereto and provided with an aperture in the periphery thereof, a resilient plate positioned on said sleeve, a pin positioned on said resilient plate and adapted to enter said aperture, a double armed lever intermediately pivoted on the free end of said resilient plate, a guide pin positioned on the inner surface of said sleeve and a sleeve-shaped connection attached to said universal joint adapted to enter said sleeve, provided with a plurality of apertures adapted to receive said pin and provided with a plurality of guide-grooves adapted to engage said guide pins to index the apertures in said sleeve and said connection.

JOHAN PETTER JOHANSSON.